United States Patent [19]

Moran

[11] 4,153,924
[45] May 8, 1979

[54] INRUSH CURRENT RESTRAINT CIRCUIT FOR ALTERNATING POWER SYSTEM SWITCH

[75] Inventor: Richard J. Moran, Milwaukee, Wis.

[73] Assignee: McGraw-Edison Company, Elgin, Ill.

[21] Appl. No.: 841,347

[22] Filed: Oct. 12, 1977

[51] Int. Cl.$^2$ .............................................. H02H 3/08
[52] U.S. Cl. ........................................ 361/94; 361/96; 361/110; 361/31
[58] Field of Search ................... 361/94, 95, 93, 96, 361/97, 98, 71, 75, 31, 29, 110, 111, 109, 196, 197; 307/293, 294

[56] References Cited

U.S. PATENT DOCUMENTS

| | | | |
|---|---|---|---|
| 3,571,661 | 3/1971 | Schultz et al. | 361/73 X |
| 3,590,326 | 6/1971 | Watson | 361/96 |
| 3,662,220 | 5/1972 | Riebs | 361/97 |
| 3,739,229 | 6/1973 | Moran | 361/65 |
| 4,002,948 | 1/1977 | Gary et al. | 361/96 X |
| 4,041,540 | 8/1977 | Kampf et al. | 361/96 X |

Primary Examiner—Patrick R. Salce
Attorney, Agent, or Firm—Thomas E. McDonald; Ronald J. LaPorte; Jon Carl Gealow

[57] ABSTRACT

An inrush current restraint circuit, for use with a typical overcurrent minimum pickup circuit of a power system switching device, such as a recloser or sectionalizer, for raising the initial overcurrent minimum pickup value upon closure of the switching device to a selected value, then linearly returning this pickup value to normal within a selected period of time. The minimum pickup circuit is actuated by the voltage drop across a current sensing resistor, through which a current signal proportional to current in the power system is passed. The initial pickup overcurrent value is increased by providing another current path in parallel with the current sensing resistor when the switching device is closed. A timing capacitor is discharged each time the switching device is open, then charged from a constant current source each time the switching device is closed. The voltage across this timing capacitor is applied to the input of an amplifier having a unity voltage gain and the output of this amplifier is connected in series with a second resistor across the current sensing resistor. When the timing capacitor is charged to a voltage higher than the voltage produced across the current sensing resistor, the amplifier is back biased to effectively open the additional current path through the second resistor, and return the minimum pickup current to its normal value.

18 Claims, 8 Drawing Figures

4,153,924

INRUSH CURRENT RESTRAINT CIRCUIT FOR ALTERNATING POWER SYSTEM SWITCH

BACKGROUND OF INVENTION

1. Field of Invention

The invention relates generally to protective devices for detecting overcurrent conditions in an alternating electric power circuit, and, more particularly, to a circuit for raising the minimum overcurrent value sensed by these protective devices for a limited time each time the power system is re-energized after having been opened.

2. Prior Art

Each time an electric power circuit is energized there is a transient inrush current that rapidly rises to a peak and then decays to a normal load current level in a period of time which may range from a fraction of a second to several minutes, depending on the type and diversity of loads on the power circuit and the length of time the circuit has been de-energized.

These transient inrush currents often cause application problems with both enclosing circuit breakers and sectionalizer switches. For example, on sectionalizers feeding different loads from a common line which has a fault interrupter, a permanent fault on one branch line causes the other branch sectionalizers to arm due to the inrush current, then count or trip on subsequent operations of the fault interrupter.

Reclosers usually have two fast fault openings to clear branch line faults before the tap fuses can blow, followed by two slow fault openings to allow the tap fuses to blow. In some cases, the inrush current to a power circuit exceeds the fast time-current tripping characteristic of the recloser for that circuit, thus producing unnecessary operations of this recloser. Also, at times, the minimum overcurrent tripping value of a recloser must be set at a relatively low value in order to coordinate with upline backup devices, and in such a case, the inrush current can cause such a recloser to operate to lockout.

Typically, the overcurrent pickup circuits of both reclosers and sectionalizer switches are activated by the voltage drop across a resistive element caused by the flow of a DC current through this resistive element which is proportional to the phase or ground currents of the electric power circuit. In known inrush current restraint circuits for sectionalizer switches, such as those disclosed in U.S. Pat. No. 3,571,661, issued Mar. 23, 1971 to Blaine H. Schultz, and U.S. Pat. No. 3,739,229, issued June 12, 1973 to myself, when voltage or current is initially sensed at the sectionalizing switch following a period of de-energization, a relay is energized for a selected period of time to connect a second resistive element in parallel with the resistive element connected across the input to the overcurrent pickup circuit, and thus bypass a portion of the current which is proportional to the phase or ground current. In this way, the minimum overcurrent pickup value is increased to a higher constant value for a constant period of time following re-energization of the power line.

In both of these known inrush current restraint circuits, the overcurrent pickup value is increased by a fixed percentage above the normal pickup value, whereas an actual inrush current to a power circuit generally rises relatively rapidly to a peak value, then decays at a slower rate back to its normal value. Ideally, an inrush current restraint circuit, which modifies the overcurrent pickup value to closely follow the inrush current characteristics of the power system would still provide the minimum necessary restraint, and, at the same time, provide the most sensitive protection against low level faults.

SUMMARY OF THE INVENTION

Therefore, it is a primary object of the invention to provide an inrush current restraint circuit for use with the overcurrent pickup circuit of a circuit interrupter or sectionalizer switch which modifies the minimum overcurrent pickup value of the pickup circuit for a preselected period of time each time the power circuit is energized followed by a period of de-energization, so that the minimum pickup value decreases from a predetermined peak value back towards its normal value during this selected period of time.

The inrush current restraint circuit disclosed herein can be used with any overcurrent pickup circuit for a recloser or sectionalizer wherein a current sensing circuit coupled to the electric power circuit produces a DC current, proportional to the power system current, which flows through a first resistor connected across the outputs of the pickup circuit, and the pickup circuit is picked up when the voltage across this first resistor exceeds a predetermined value. For example, such a pickup circuit for a circuit interrupter is disclosed in my U.S. Pat. No. 4,027,203, issued May 31, 1977. Also, this type of pickup circuit for a sectionalizer switch is disclosed in the above referenced U.S. Pat. Nos. 3,571,661 and 3,739,229.

In a first imbodiment of this invention, a power circuit sensing device, which may be either a current sensing or voltage sensing device, is coupled to the electric power circuit to sense whether the power circuit is energized or de-energized. When the power circuit is energized after a outage period, this power sensing device actuates a timing circuit, which in turn, operates a switching device which connects a second resistor and capacitor in series across the input to the pickup circuit. After a period of time determined by the timing circuit, the switching circuit reverts to its original state, disconnecting the capacitor and second resistor from the pickup circuit terminals, and shorting the terminals of this capacitor through a capacitor discharge resistor. When the power circuit is next de-energized, the power sensing device will reset the timing circuit so that when the power system is again energized, this timing circuit will again operate the switching device to disconnect the capacitor discharge resistor and connect the second resistor and capacitor in series across the input of the pickup circuit.

Since the capacitor is discharged when it is first connected with the second resistor in series with the first resistor, the initial resistance across the inputs of the pickup circuit will equal the product of the first and second resistors divided by the sum of these resistors. Also, since the voltage necessary to actuate the pickup circuit is proportional to the product of the first resistor times the normal pickup current, the value of the second resistor, for any particular multiple of the normal pickup current desired when the power system is first re-energized, will equal the value of the first resistor divided by the multiple of the normal pickup desired minus one. This initial minimum pickup current value will decrease towards its normal value as the capacitor is charged.

This inrush current restraint circuit differs from the known restraint circuits described herein in that the minimum pickup current value is maintained at its highest level for only a very short portion of the operative time of the current restraint circuit, as determined by the timing circuit, rather than for the full duration of this time interval. However, only the initial pickup value can be predetermined, since the rate at which this pickup value decreases to its normal value depends not only upon the capacitor and the first and second resistors, but also upon the magnitude and duration of the inrush current itself, which varies depending on the power system outage time, and the type and number of loads connected to the system at the time of re-energization.

Therefore it is another object of the invention to provide a current restraint circuit for power system interruptors or sectionalizer switches which raises the minimum pickup current to a predetermined multiple of the normal pickup current when the power system is first energized, then allows this initial pickup current to decrease at a predetermined rate to the normal value of the pickup current within a predetermined period of time. This object is achieved by connecting a timing capacitor to be charged from a separate DC power source through a third resistor each time the power system is energized. The input of a high gain, voltage follower type amplifier is connected across this timing capacitor, and the output of this amplifier is connected in series with the second resistor and a switching device which connects the second resistor and the amplifier output across the first resistor when the power system is initially energized. This timing capacitor is thus charged at a known rate regardless of the inrush current to the power system, and the voltage across the capacitor will appear across the output of the amplifier in series with the second resistor, so that at any time while this second current path is connected across the first resistor, the value of the pickup current can be accurately determined.

In a modification of this restraint circuit, the timing capacitor is charged from a constant current DC power source which linearly charges this timing capacitor with respect to time, and thus facilitates the accurate determination of the minimum pickup current at any time after energization of the alternating power system.

Further objects and advantages will become more apparent from the following detailed description of the invention, taken in conjunction with the drawings.

DESCRIPTION OF PREFERRED IMBODIMENT

Figure 1:
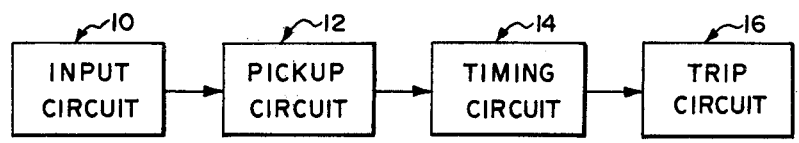
FIG. 1 is a block diagram of a typical overcurrent sensing and tripping circuit of a recloser or other circuit interrupter.

Referring now to FIG. 1, the tripping control circuit of a recloser includes an input circuit 10 for producing a DC current proportional to the phase or ground currents of an alternating power circuit. For a single phase power system, this input circuit 10 may consist merely of a single current transformer having its secondary winding connected to a single phase, full wave, rectifier bridge whose output is connected to the pickup circuit of the recloser tripping a control circuit. For a three phase power system, the phase current tripping circuit may include a input circuit similiar to that disclosed in my U.S. Pat. No. 4,027,203, issued May 31, 1977 which includes three current transformers, each coupled to respective phase line, and each having a secondary winding connected to the input of a respective one of three, single phase, full wave, rectifier bridges whose positive and negative outputs are connected in parallel to supply a DC current signal to the pickup circuit 12. In a ground overcurrent tripping circuit for a three phase power system, the input circuit 10 may consist of three current transformers having secondary windings connected in parallel across the inputs of a three phase full wave rectifier bridge, whose output is connected to the pickup circuit 12, as disclosed in the above referenced U.S. Pat. No. 3,739,229. Upon receipt of a current signal from the input circuit 10 indicating a phase or ground fault in the power system, the pickup circuit 12 actuates a timing circuit 14, such as that disclosed in the above referenced U.S. Pat. No. 4,027,203, which, after a predetermined period of time (usually inversely proportional to the magnitude of the fault current), actuates the trip circuit 16 of the recloser.

Figure 2:
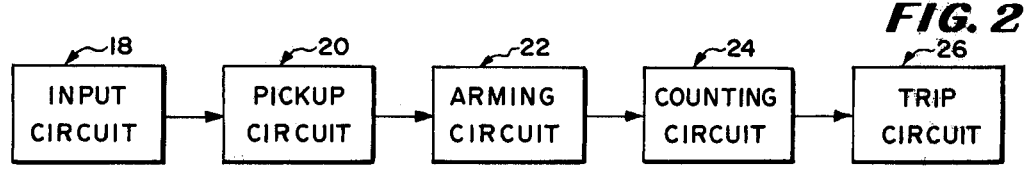
FIG. 2 is a block diagram of a typical control circuit for a sectionalizer switch.

The control circuit for a sectionalizer switch, as shown in the block diagram of FIG. 2, includes an input circuit 18 and a pickup circuit 20 similiar to the input and pickup circuits 10, 12 of a recloser. However, upon sensing a fault condition the sectionalizer pickup circuit 20 actuates an arming circuit 22 which, upon the occurance of a loss of either voltage or current in the power system indicating the operation of an upline circuit breaker or recloser, operates a counting circuit 24. After a predetermined number of counts, the counting circuit 24 actuates the trip circuit 26 during a period of time in which the power circuit is de-energized, so that the sectionalizer opens when there is no current flowing in the power circuit.

Figure 3:
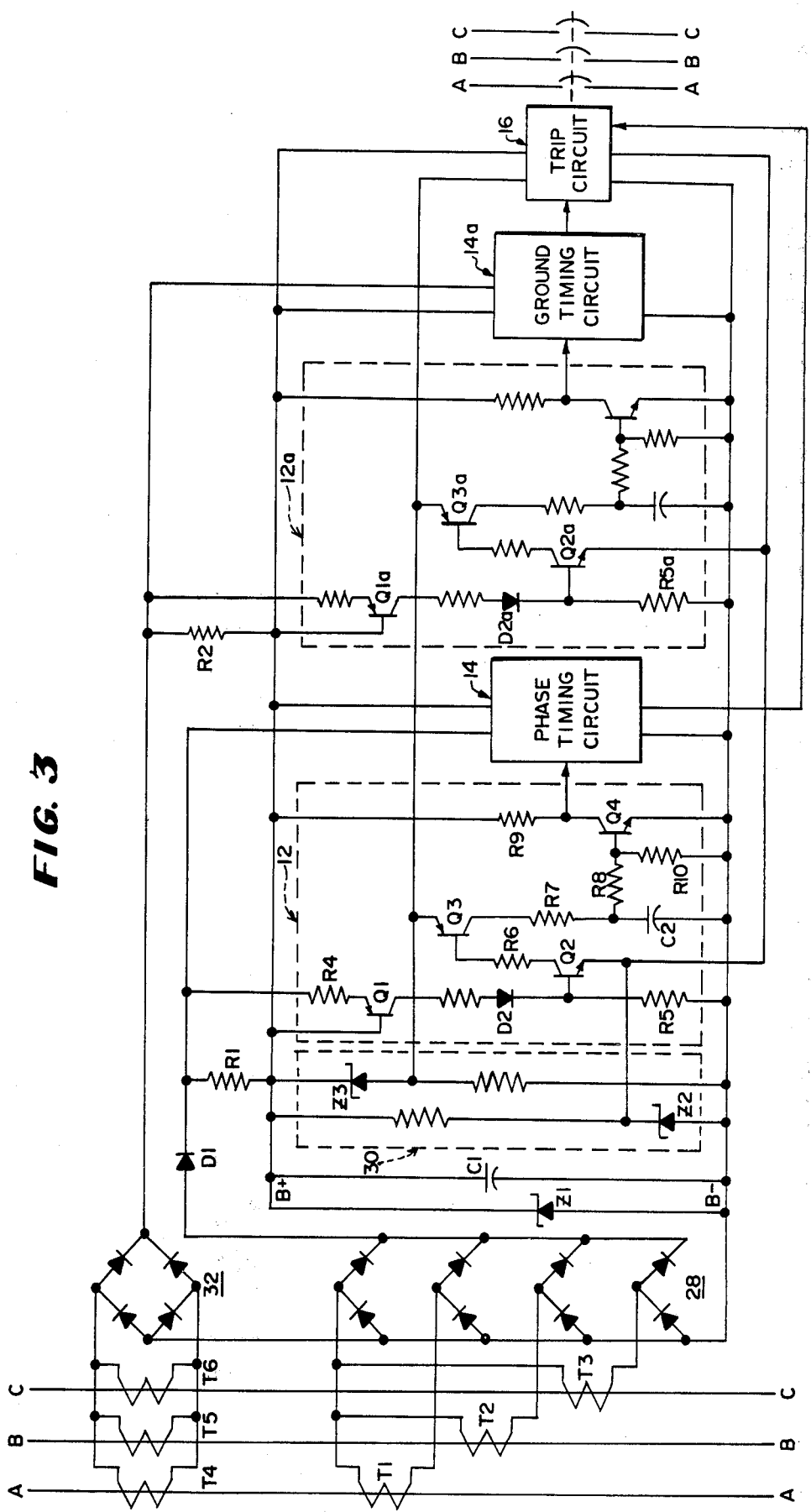
FIG. 3 is a schematic diagram, partially in block form, of a typical control circuit for a circuit interrupter having phase and ground overcurrent tripping circuits.

FIG. 3 illustrates a control circuit for a three phase circuit interrupter similar to that disclosed in my copending U.S. Pat. application Ser. No. 780,815, filed Mar. 24, 1977, having both phase and ground overcurrent input and pickup circuits. Three current transformers T1, T2, T3 are each magnetically coupled to respective phase lines A, B, C of a three phase electric power circuit. The secondary windings of these three current transformers T1, T2, T3, are wye-connected, with their neutral and phase terminals being connected to supply current to an eight diode rectifier bridge 28, also described in the above referenced U.S. Pat. application Ser. No. 780,815. One end of a phase current sensing resistor R1 is connected through a diode D1 to the positive potential DC output of the rectifier bridge 28, and the other end of this resistor R1 is connected to the positive side B+ of a power supply capacitor C1. The negative side B− of this power supply capacitor C1 is connected to the negative potential DC output of the bridge 28, and a zener diode Z1 is connected across the power supply outputs B+, B− of the capacitor C1. Thus, the positive polarity portion of the phase and ground currents $I_a$, $I_b$, $I_c$, $I_n$ induced in the secondary windings of the current transformers T1, T2, T3 by line currents flowing in the phase lines A, B, C of the electric power circuit are rectified in the rectifier bridge 28 and used to charge the power supply capacitor C1. After this capacitor C1 has been charged to its rated voltage, the zener diode Z1 connected across this capacitor C1 defines a low impedance path and thus maintains the sensing network functioning as a current source. As explained in the above referenced U.S. Pat. application Ser. No. 780,815, the phase current sensing resistor R1 will produce a peak voltage proportional to the peak phase current of the electric power circuit at least once every half cycle. Upon the occurance of a predetermined minimum voltage across the resistor R1 indicating a phase overcurrent condition, a phase pickup circuit 12 activates a phase timing circuit 14, which, after a time delay proportional to the voltage output of the resistor R1, actuates an output circuit 16 which trips the circuit interrupter. An inhibitor circuit 30 prevents operation of the phase pickup circuit 12 and the output circuit 16 until the power supply capacitor C1 is charged to an operational level.

Three additional current transformers T4, T5, T6 are also each magnetically coupled to respective phase lines A, B, C of the three phase electric power circuit. The secondary windings of these current transformers T4, T5, T6 are connected in parallel across the AC inputs of a single phase, full wave, rectifier bridge 32. The positive potential DC output of the rectifier bridge 32 is connected through a ground current sensing resistor R2 to the B+ side of the power supply, and the negative potential DC output of this rectifier bridge 32 is connected to the negative potential DC output of the eight diode rectifier bridge 28 and the B− side of the power supply. This ground current sensing resistor R2 produces a peak voltage every half cycle proportional to the peak value of the ground current of the electric power circuit. Upon the occurrence of a predetermined minimum voltage across the resistor R2 indicating a ground current overcurrent condition, the ground pickup circuit 12a, similiar or identical to the phase pickup circuit 12, activates a ground timing circuit 14a, which, after a predetermined time delay, activates the output circuit 16 to trip the circuit interrupter. The operation of these phase and ground pickup and timing circuits 12, 12a, 14, 14a, the trip circuit 16 and the inhibitor circuit 30 are fully described in the above referenced U.S. Pat. application Ser. No. 780,815 and hence will be discussed only in such detail as necessary for the understanding of the inrush current restraint circuit discussed herein.

In the phase pickup circiuit 12, a phase overcurrent sensing PNP transistor Q1 has its base connected to the B+ power supply line. The emitter of this transistor Q1 is connected in series with the resistor R4 to the junction between the diode D1 and the resistor R1, and its collector is connected in series with a diode D2 and a resistor R5 to the B− power supply line. The transistor Q1 is thus connected in a common base configuration, and the resistor R4 is selected to be large relative to the resistor R1 to establish a high impedance detection means. The voltage drop across the resistor R1 will cause a small current flow through the resistor R4 and the emitter-to-base junction of the sensing transistor Q1 to bias this transistor Q1 on. Conduction of the transistor Q1 produces a voltage across the resistor R5, which is coupled to turn on an NPN transistor Q2, the output of which conducts if the inhibit circuit 30 indicates that the capacitor C1 has been charged to its operating level. This transistor Q2 has its base connected to the junction of the diode D2 and the resistor R5, and its emitter connected to the B− power supply line through a zener diode Z2 of the inhibit circuit 30. The collector of the transistor Q2 is connected through a coupling resistor R6 to the base of a PNP transistor Q3 which has its emitter connected to the B+ power supply line through another zener diode Z3 of the inhibit circuit 30. In this way the transistor Q3 cannot conduct unless the capacitor C1 is at a voltage level sufficient to overcome the voltages of the zener diode Z2 and Z3 as well as the base-to-emitter voltage of the transistor Q3.

The transistor Q1 is connected in a common base configuration, so that its collector current will approximately equal its emitter current. The current supplied to the resistor R5 therefore is essentially proportional to the phase overcurrent of the alternating power system and develops a bias voltage across the base-to-emitter junction of the transistor Q2 and the zener diode Z2. When that voltage exceeds the sum of these two voltages, the transistor Q2 turns on. If the B+ power supply line is at its operating voltage, the transistor Q3 turns on in the corresponding period that the sensing current signal flowing through the resistor R1 exceeds the pickup value, and supplies an output signal indicative of the phase overload condition. The collector of the transistor Q3 is connected in series with a resistor R7 and a hold-on capacitor C2 to the B− power supply line. A coupling resistor R8 connects the junction of the resistor R7 and the capacitor C2 to the base of an NPN transistor Q4, which has its emitter connected to ground and its collector connected to the B+ power supply line in series with a resistor R9. A bias resistor R10 is connected between the base and the emitter of the transistor Q4. The time constant of the resistor R7 and the capacitor C2 is selected to provide a very rapid charging of the capacitor C2, which then is slowly discharged through the resistor R8 and the base-to-emitter circuit of the transistor Q4 in parallel with the resistor R10.

In response to a phase overcurrent signal, the transistors Q2 and Q3 will turn on during the peak period of each half cycle of current, and rapidly charge the capacitor C2. The charge on the capacitor C2 will maintain the transistor Q4 on until the next peak period of the following half cycle of current, and thus will maintain a phase overcurrent signal as long as the capacitor C2 is recharged every half cycle. If the capacitor C2 is not recharged in the next succeeding cycle, the capacitor C2 will then completely discharge and turn off the transistor Q4 until a new phase overcurrent is sensed. The phase overcurrent signal from the transistor Q4 is applied to the phase timing circuit 14 to activate this timing circuit. The ground pickup circuit 12a corresponds closely with the phase pickup circuit 12, and is not discussed in detail herein.

This typical pickup circuit 12 can be used as a pickup circuit for a sectionalizer switch, in which case the overcurrent output signal from the transistor Q4 is applied to the arming circuit 22, rather than the timing circuit 14. DC power may be supplied from a full wave rectifier bridge connected to the secondary of a transformer coupled to the power system ahead of the breaker or sectionalizer switch, as described in the above referenced U.S. Pat. No. 3,739,229, or can be supplied from a station battery source, in which case there may be no need for the zener diode Z3 and the emitter of the transistor Q3 can be connected directly to the B+ power supply. Also, the output connections to the DC bridges 28, 32, can be reversed, with the resistors R1, R2 connected between respective negative outputs of these bridges 28, 32 and the B− power supply line, in which case transistors of opposite polarity would be used for the transistors Q1, Q2, similar to the pickup circuit disclosed in U.S. Pat. No. 3,739,229. Actually, the current restraint circuits described herein can be used with any overcurrent pickup circuit which is actuated by a minimum predetermined DC voltage across a resistive element or network, caused by the flow therethrough of a DC current proportional to an alternating power system current.

Figure 4:
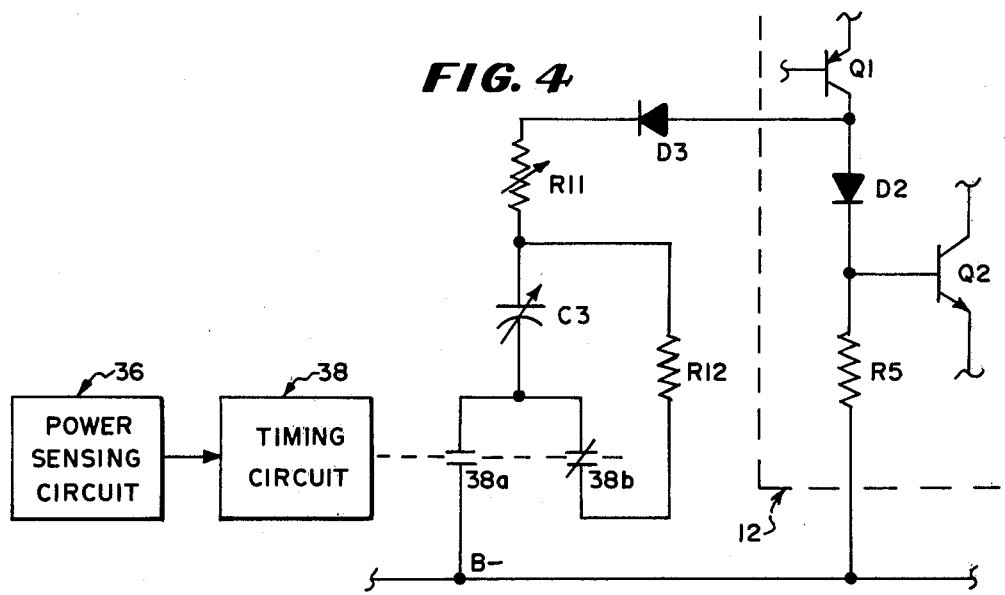
FIG. 4 is a schematic diagram, partially in block form, of an inrush current restraint circuit for use with the interrupter control circuit of FIG. 3.

The current restraint circuit of FIG. 4 is similar to the current restraint circit disclosed in U.S. Pat. No. 3,739,229, in that a power sensing circuit 36 (which may be either a voltage or current sensing device) coupled to the alternating power circuit for sensing whether this power circuit is energized or deenergized, activates a timing circuit 38 each time the power circuit is energized, which connects a current path in parallel with the resistor R5 for a selected period of time. Since a portion of the sensing current signal is diverted through this second current path, a higher pickup current is required to produce the necessary voltage across the resistor R5 to actuate the pickup circuit 12. However, the switched parallel current path of the restraint circuit of FIG. 4 includes a capacitor C3 connected in series with a resistor R11 so that when the second current path is switched into the pickup circuit parallel with the resistor R5, the pickup current value will be initially raised to a predetermined value, then decreased exponentially with time at a rate determined by the values of the capacitor C3 and the resistor R11. In this way, the overcurrent pickup characteristics more closely follow the inrush current characteristics of the power system, and provides more sensitive protection against low level faults occuring during this period of time following re-energization of the system.

When the timing circuit 38 is activated, it opens a normally closed contact 38b which is connected in series with a resistor R12 across the capacitor C3 to discharge this capacitor, and it closes a normally open contact 38a to connect the capacitor C3 in series with resistor R11 across the resistor R5. A blocking diode D3 is disposed between the collector of the transistor Q1 and the resistor R11 to prevent the capacitor C3 from discharging through the resistor R5 during fluctuations of the sensing current or as the inrush current decreases. The diode D2 is disposed between the collector of the transistor Q1 and the junction of the resistor R5 and the base of the transistor Q2 to compensate for the voltage drop across the blocking diode D3, so that the initial pickup current following re-energization of the power system relative to the normal pickup current, is determined solely by the relative values of the resistors R5 and R11.

Figure 5:
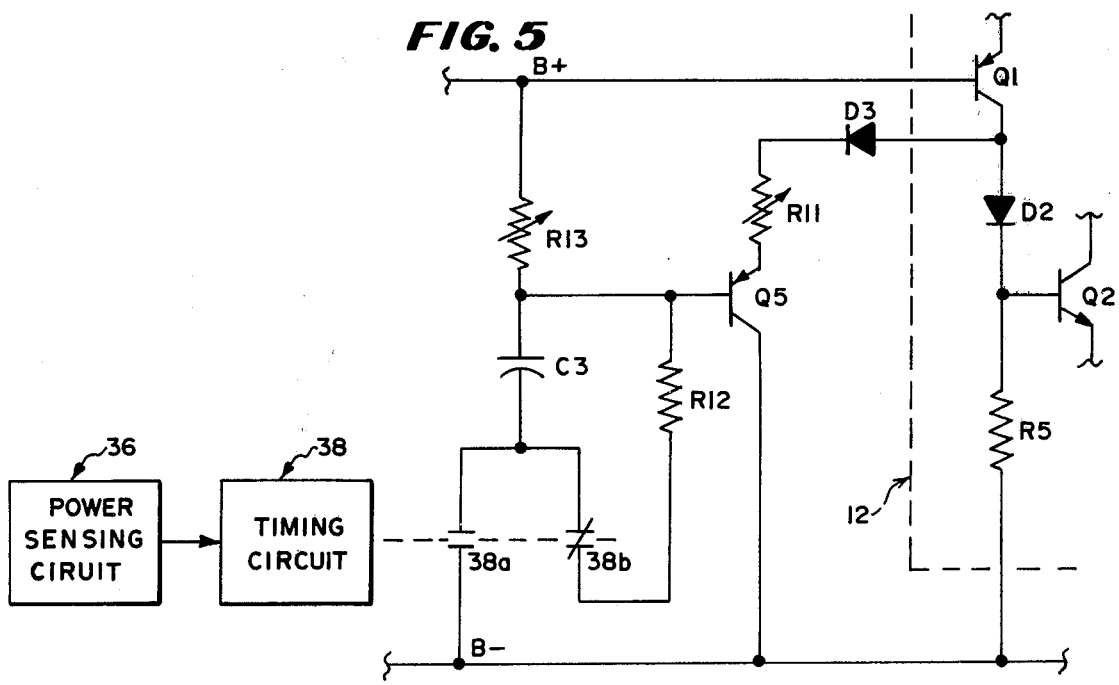
FIG. 5 is a schematic diagram, partially in block form, of a modification of the inrush current restraint circuit of FIG. 4.

Ideally, when an inrush current of higher than normal magnitude or duration occurs, the pickup current would be raised to a higher magnitude and decreased at a slower rate than would be the case during a normal inrush current. However, since the rate at which the capacitor C3 is charged depends upon the magnitude and duration of the sensing current supplied to the pickup circuit 12, the rate at which the pickup value decreases durng this initial period will be higher durng inrush current of long duration than it will be during a inrush current of short duration. In the current inrush restraint circuit illustrated in FIG. 5, this disadvantage is overcome by separately charging the capacitor C3 through a variable resistor R13 from the B+ supply line, and coupling the voltage output of the capacitor C3 in series with the resistor R11 through a high gain, emitter follower amplifier so that the voltage across the output of this amplifier connected in series with the resistor R11 across the resistor R5 closely follows the voltage output of the capacitor C3 applied to the input of this amplifier. This amplifier is shown in FIG. 5 as a single PNP transformer Q5 having its emitter connected to the resistor R11, its collector connected to the B− power supply line, and its base connected to the junction of the resistor R13 and capacitor C3, although actually, a multi-stage amplifier may be employed to insure that the base current of this amplifier does not contribute significantly to charging of the capacitor C3. Thus, when the inrush current restraint circuit of FIG. 5 is used in conjunction with the pickup circuit 12, in the period following re-energization of the power system, the overcurrent pickup current will be raised to a preselected value, then decreased at a selected exponential rate to its normal value. However, measurements of the inrush current characteristics of actual distribution systems indicate that the inrush current does not return to normal at a constant exponential rate. For example, after an extended outage, the inrush current of a distribution line may not start to decrease appreciably for several seconds following re-energization.

A capacitor-resistor timing network, similar to those used in the timing circuits interrupters, as for example, the passive R-C networks disclosed in the above referenced U.S. Pat. No. 4,027,203, can be used in place of the timing capacitor C3 of FIGS. 4 and 5, to more closely match the overcurrent pickup characteristics with a known actual inrush current characteristic.

Figure 6:
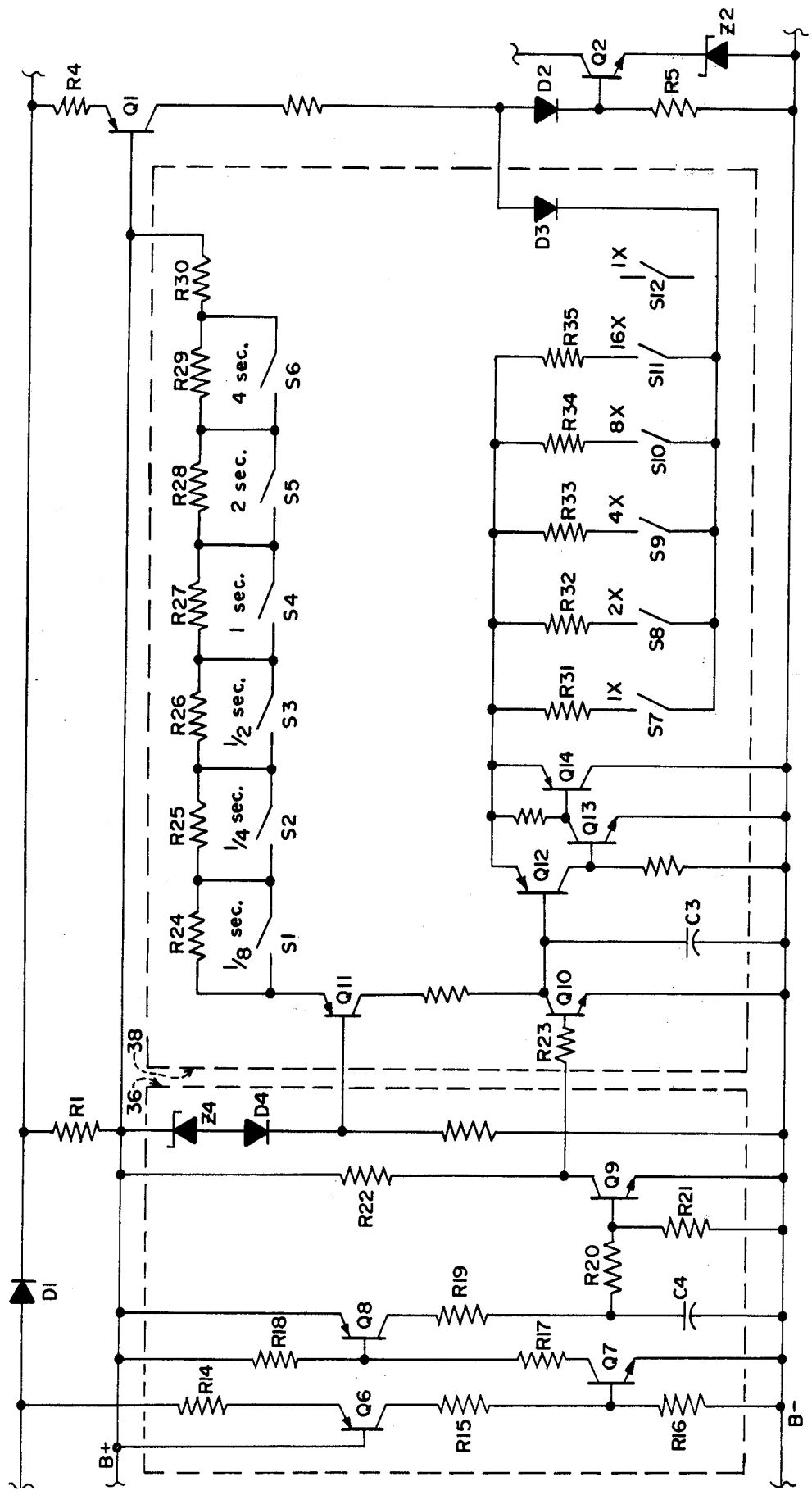
FIG. 6 is a schematic diagram of a preferred phase inrush current restraint circuit.

In a preferred embodiment of this invention, illustrated in FIG. 6, the capacitor C3 is charged linearly with time rather than exponentially. This not only allows the initial pickup current values to be more closely matched with the inrush current values of the power system, but also permits easy determination of the pickup current at any time after re-energization of the power system, to thus facilitate the coordination of tripping characteristics of the circuit interrupter or sectionalizer switch with other protective devices or with the characteristics of the power line.

Figure 7:
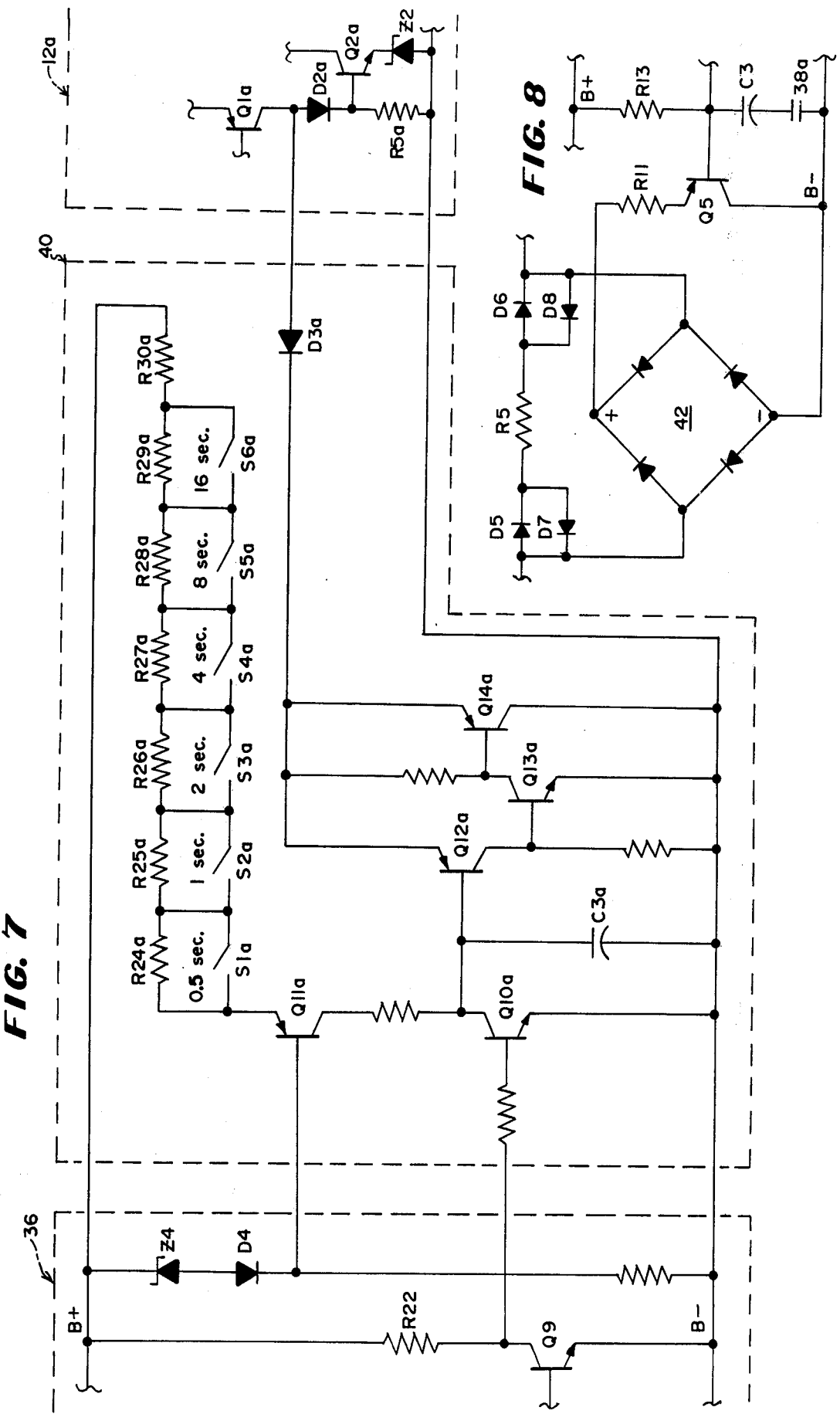
FIG. 7 is a schematic diagram of a preferred ground inrush current restraint circuit.

The power sensing circuit 36 of FIG. 6 for sensing whether the power system is energized or de-energized is used to activate both the phase inrush current restraint circuit 38 ashown in FIG. 6, and the ground inrush current restraint circuit 40 shown in FIG. 7. This power sensing circuit 36 is very similar to the overcurrent pickup circuit 12, and includes a PNP transistor Q6 having its base connected to the B+ power supply, its emitter connected through a relatively high value resistance R14 to the positive DC output terminal of the eight diode rectifier bridge 28 of FIG. 3, and its base connected through a limiting resistor R15 to the base of a NPN transistor Q7 and to a resistor R16 connected between the base of the transistor Q7 and the B− power supply line. The emitter of the transistor Q7 is connected to the B− power supply, and its collector is connected through the resistors R17 and R18 in series to the B+ power supply line. A PNP transistor Q8 has its base connected to the junction of the resistors R17 and R18, its emitter connected to the B+ power supply, and its collector connected through a limiting resistor R19 to the positive side of a capacitor C4 whose negative side is connected to the B− power supply line. The positive side of the capacitor C4 is also connected through a resistor R20 to the base of a NPN transistor Q9, which is also connected to the B− power supply line through a resistor R21. The emitter of the transistor Q9 is connected to the B− power supply line, and its collector is connected through a resistor R22 to the B+ power supply line. This transistor Q9 is switched off whenever there is no current flowing through the alternating power system and is switched on continuously whenever there is current flowing in at least one phase of the power system, to thus produce a signal to activate the phase and ground inrush current restraint circuits 38, 40.

The transistor Q6 and Q7 sense the current signal output of the phase rectifier bridge 28 by the flow of current through the resistors R14 and R16. The diode D1, disposed between the positive DC output of the bridge 28 and the phase current sensing resistor R1, compensates for the emitter-to-base drop of the transistor Q6 so that essentially any single phase power system current causes the transistors Q6 and Q7 to turn on and off during each half cycle of current flow, while the flow of current in at least two phases of the power system will keep the transistors Q6 and Q7 turned on continuously. The transistor Q8 amplifies the collector current of transistor Q7 to thus quickly charge the capacitor C4 through the limiting resistor R19. When the transistors Q7 and Q8 are turned off, the capacitor C4 discharges at a relatively slow rate through the resistor R20 and the base-to-emitter circuit of the transistor Q9. The rate of discharge of this capacitor C4 is selected to be such that so long as this capacitor C4 is recharged every half cycle of current, it will supply a signal to the base of the transistor Q9 to keep the transistor Q9 turned on continuously. When all current flow in the alternating power system ceases, indicating the system has been de-energized, the transistor Q9 will turn off in the next half cycle time interval period. When this transistor Q9 is turned off, the voltage at its collector, which is connected to the B+ power supply line through the resistor R22, will become more positive and approach the voltage of the B+ power supply line. When the power system is again re-energized and the transistor Q9 is turned on, the voltage at its collector decreases to a negative value, only slightly above the voltage of the B− power supply line because of the voltage drop through the transistor Q9. This decrease in voltage of the collector the voltage at its collector decreases to only slightly above the voltage of the B− power supply line because of the voltage drop throught the transistor Q9. This decrease in voltage of the collector of the transistor Q9 serves as a signal to actuate both the phase current restraint circuit 38 shown in FIG. 6 and the ground current restraint circuit 40 shown in FIG. 7.

The phase pickup current restraint circuit 38 includes a NPN transistor Q10 having its emitter connected to the B− power supply line, its base connected to the collector of the transistor Q9 through a resistor R23, and its collector connected to the positive side of the timing capacitor C3, which has its negative side connected to the B− power supply line. A PNP transistor Q11 has its collector connected to the positive side of the timing capacitor C3, and its base connected in series through a diode D4 and a zener diode Z4 having the same voltage rating as zener diode Z3 shown in FIG. 3, to the B+ power supply line.

The emitter of the transistor Q11 is connected in series through the resistors R24–30 to the B+ supply line. Each of the resistors R24–29 have a respective shorting switch S1–S6 connected across its ends, which may be opened or closed to thus select the appropriate emitter resistance for the transistor Q11.

When the power system has been de-energized and the transistor Q9 is turned off, base current is supplied to the transistor Q10 through the resistors R22 and R23 to turn on the transistor Q10, and thus discharge the timing capacitor C3. When the power system is re-energized, the transistor Q9 is turned on, removing the base current to the transistor Q10 and turning off this transistor. Then, as soon as the power supply voltage is sufficient to overcome the voltage drop through the diode Z4 and the diode D4, the transistor Q11 will turn on, to thus allow the timing capacitor C3 to be charged at a constant current proportional to the emitter resistance of the transistor Q11. Since the transistor Q11 is connected in a common base configuration, its collector current will approximately equal its emitter current, which is determined by the selected combination of the resistors R24–R30 between the emitter of the transistor Q11 and the B+ power supply line. Thus the timing capacitor C3 will be charged at a preselected constant linear rate until it is charged to a voltage equal to the voltage of the B+ power supply line less the voltage drops through the zener diode Z4, the diode D4, and the base-to-collector voltage drop of the transistor Q11.

The input of a high gain, three stage, emitter follower amplifier is connected across the timing capacitor C3 so that the voltage of the output of this amplifier will follow the voltage across the timing capacitor C3. This amplifier includes a PNP transistor Q12 having its base connected to the positive side of the timing capacitor C3, an NPN transistor Q13 having its base connected to the collector of the transistor Q12 and its emitter connected to the B− power supply line, and a PNP transistor Q14 having its emitter connected to the emitter of the transistor Q12, its base connected to the collector of the transistor Q13, and its collector connected to the B− power supply line. The emitters of the transistors Q12, Q14 are connected through a series of switched, parellel-disposed resistors R31–R35, in series with diode D3, to the collector of the transistor Q1 of FIG. 3. Each of these resistors R31–R35 is connected in series with a respective switch S7–S11 so that these resistors can be individually inserted into, or removed from, the circuit between the emitters of the transistors Q12, Q14 and the diode D3.

When the power system is first re-energized, and the transistor Q10 is turned off, there will be no voltage across the timing capacitor C3, and the initial value of the phase pickup current will be determined by the parallel combination of the resistor R5, shown in FIG. 3, and the selected parallel combination of the resistors R31–R35. The diode D3 is used to prevent base-to-emitter breakdown of the emitter follower amplifier and the subsequent discharge of the timing capacitor C3 across the resistor R5 when this capacitor C3 is charged to higher value than the voltage drop across the resistor R5. The diode D2 is disposed in series with the resistor R5 to compensate for the voltage drop across the diode D3, so that the initial phase current pickup value relative to the normal phase current pickup value, will be determined solely by the ratio of the resistor R5 to the selected resistance disposed between the diode D3 and the emitters of the transistors Q12, Q14.

The resistors R31–R35 can be chosen so that the initial minimum pickup current when the power system is first re-energized is equal to an even multiple of the normal minimum pickup current. For example, the resistor R31 can be made of equal value of the resistor R5, so that when only this resistor is connected in the current restraint circuit, the initial minimun pickup current will be twice the normal pickup current. The resistor R32 can be made to be half the value of that resistor R31 or of the resistor R5, so that when this resistor R32 is connected into the restraint circuit, it will produce an increase of two times the normal pickup value. Thus for example if both the resistors R31 and R32 are connected into the restraint circuit through their respective switches S7 and S8, the initial minimum pickup current upon re-enerization of the power system will be 1+1+2, or four times the normal minimum pickup current. Similarly, the resistor R33 can be chosen to be half the value of the resistor R32, the resistor R34 half that of R33, and the resistor R35 half that of the resistor R34, so that the resistors R31–R35 will increase the minimum pickup current above its normal value by 1, 2, 4, 8 and 16 times the normal pickup current. Thus, by closing the proper combination of the switches S7–S11, the initial minimum pickup phase current can be programmed as a multiple of the normal pickup current in even multiple steps from the normal pickup current to 32 times the normal pickup current. Each of the switches S7–S11, can be labeled as a multiple of the normal pickup current, and a dummy switch S12, which is always closed, can be included with the array of switches S7–S11 so that the multiple of the normal minimum pickup current occurring when the system is first re-energized can be determined merely by adding the labelled values of the switches S7–S12 which are closed.

Referring again to FIG. 3, the transistor Q2 will be turned on when its base voltage, which is equal to the voltage across the resistor R5, exceeds its emitter voltage, which is equal to the voltage across the zener diode Z2 plus the base-to-emitter voltage drop through the transistor Q2. Since the voltage drop across the diode D3 is approximately equal to the voltage drop across the diode D2, and the base-to-emitter voltage drop across the transistor Q12 is approximately equal to the base-to-emitter voltage drop across the transistor Q2, when the capacitor C3 is charged to the voltage across the zener diode Z2, the transistors Q12, Q13, Q14 will turn off to open the parallel current path bypassing the resistor R5, at which time the minimum pickup phase current value will have returned to normal. Since the constant current at which the capacitor C3 is charged depends upon the emitter current of the transistor Q11, that is, upon the selected resistors R24–R30 which are connected in series between the emitter of the transistor Q11 and the B+ power supply line, each of these resistors R24–R40 can be selected to be a different value, each of which will charge the timing capacitor C3 to the voltage of the zener diode Z2 in a different period of time. For example, neglecting the effect of the resistor R30 which is discussed hereinafter, the value of the resistor R24 can be selected so that when only this resistor R24 is connected in the current restraint circuit 38, the timing capacitor C3 will be charged to the voltage of the zener diode Z2 in approximately ⅛ of a second. Similiarly, the resistor R25 can be selected to be of a value of approximately twice that of resistor R24, so that when this resistor is the only resistor connected in the current restraint circuit 38, the capacitor C3 will be charged to the voltage level of the zener diode Z2 is approximately ¼ of a second. In similiar fashion the resistor R26, R27, R28 and R29, can be chosen to produce respective charging times of ½ second, 1 second, 2 seconds, and 4 seconds. In this way, the time for the initial phase minimum pickup current to return to its normal pickup value following re-energization of the power system can be programed in intervals of ⅛ of a second up to a maximum of 7⅞ seconds, using only the resistors R24–R29 in the emitter circuit of the transistor Q11.

However if only the resistors R24–R29 were used in this circuit, it would be possible to operate the transistor Q11 with all the switches S1–S6 closed so that the emitter of this transistor Q11 would be connected directly to the B+ power supply line. In such a case, depending on the rating of the transistor Q11, the transistor Q11 could be damaged by the flow of a large charging current through it when the transistor Q10 is turned off. Similarly, the shorting switches S1–S6 could be damaged if this charging current exceeded the current carrying rating of these switches. For this reason, a low value limiting resistor R30 is permanently connected in the emitter circuit of the transistor Q11, to limit the current flow through the switches S1–S6 and the transistor Q11 to a value within the rating of these devices, without appreciably effecting the accuracy of the circuit.

By properly selecting the values of the lowest resistors R24–R26, the maximum percentage deviation of any selected combination of the resistors R24–R29 which are connected to the restraint circuit 38 from its true calculated value can be limited to plus or minus one-sixth of the ratio of the limiting resistor R30 to the true calculated value of the resistor R24. For example, if the resistor R30 has a value of twelve percent of the calculated value of the resistor R24 required to charge the timing capacitor C3 to the voltage of the zener diode Z2 in ⅛ of a second, the maximum deviation of any combination of the resistors R24–R29 from its calculated value will be no more than two percent.

When the limiting resistor R30 is used, the resistor R24 is selected to have an actual value equal to its true calculated value less five-sixths of the value of the limiting resistor R30. Thus, in the above example where the limiting resistor R30 has a value of 12 percent of the calculated value of the resistor R24, the resistor R24 would be selected to have a value of 90 percent of its calculated value. When only the resistor R24 is connected into the restraint circuit 38, the series combination of the resistors R24 and R30 will then equal 1.02 times the calculated value of resistance required to charge the timing capacitor C3 to the voltage of the zener diode Z2 in ⅛ of a second. Expressing this in terms of percent deviation, the resistance value of the series connected resistors R24 and R30 will be two percent greater than the true calculated value of the resistor R24.

The resistor R25 is selected to have an actual value equal to its calculated value of twice the calculated value of the resistor R24 less two-thirds of the value of the limiting resistor R30. Thus, in the above example, the resistor R25 would be selected to have a value of 96 percent of its calculated value. When only the resistor R25 is connected to the restraint circuit 38, the series combination of the resistors R25 and R30 will equal 2.04 times the calculated value of the resistor R24 and thus will have an actual value of resistance which is two percent higher than its true calculated resistance value. When both the resistors R24 and R25 are connected into the restraint circuit 38, the series combination of the resistors R24, R25 and R30 will equal 2.94 times the calculated value of the resistor R24, or two percent less its calculated value.

The resistor R26 is selected to have a value not less than its calculated value of four times the calculated value of the resistor R24 less two-thirds of the value of the limiting resistor R30, or more than its calculated value less one-third of the value of the limiting resistor R30. Thus, in the above example, the resistor R26 can be selected to have an actual value of 99 percent of its calculated value. When only the resistor R26 is connected into the restraint circuit 38, the series combination of the resistors R26 and R30 will equal 4.08 times the calculated value of the resistor R24, and thus will be two percent greater than its calculated value. When resistor R26 is used in combination with any of the other resistors R24, R25, R27-R29 the actual resistance of the combination will be within two percent of the calculated value of the combination.

The calculated values for the resistors R27-R29 can be used in selecting these resistors, since any possible deviation will be less than one-sixth of the ratio of the limiting resistor R30 to the calculated value of the resistor R24. For example, when only the resistor R27 having a resistance value equal to eight times the calculated value of resistor R24 is connected in the restraint circuit 38, the series combination of the resistor R27 and the limiting resistor R30 will equal 8.12 times the calculated value of the resistor R24, and the actual resistance value will be one and a half percent higher than the calculated value. Actually, in the above example, in which the limiting resistor R30 has a value of twelve percent of the calculated value of the resistor R24, only six of the possible sixty-three combinations of the resistors R24-R29 will vary from their calculated values by more than plus or minus one percent, namely those combinations for the resistive values of approximately one, two, three, four, seven, and eight times the calculated resistance of the resistor R24.

Thus, the time-to-normal setting of this current restraint circuit 38, that is, the time following re-energization of the power system for the minimum phase pickup current to return to its normal value, is determined by the sum of the nominal values of the switches S1-S6 which are open, and the initial minimum phase pickup value upon re-energization of the power system is a multiple of the normal minimum pickup value, determined by the sum of the nominal multiple values of the switches S7-S12 which are closed.

Since the voltage across the output of the high gain emitter follower amplifier varies approximately linearly with time while the timing capacitor C3 is being charged to the value of the zener diode Z2, for any actual fault occurring immediately upon re-energization of the power system, the time after re-energization to phase pickup will be approximately equal to:

$$PT\left[\frac{PM - FM}{PM - 1}\right]$$

Where:
PT=phase time-to-normal, as programmed;
PM=initial phase pickup current, as programmed, expressed as a multiple of the normal minimum pickup current; and
FM=Actual fault current, expressed as a multiple of the normal minimum pickup current.

It should be noted that the use of this inrush current restraint circuit 38 does not effect the time current tripping characteristics of a circuit breaker with which the restraint circuit 38 is used, where a fault condition results in an inrush current which is higher than the programmed pickup current during the programmed time-to-normal setting of the restraint circuit 38, which facilitates the coordination of the circuit breaker with other protective devices on the system. Also, since the minimum pickup current is known at any time after re-energization of the power system, for any particular initial minimum trip setting and time-to-normal setting of the current restraint circuit 38, this inrush current restraint circuit can be adjusted to coordinate with a known inrush current characteristic of a particular power system, and also with the line characteristics of the system.

Since all of the circuit elements of the ground inrush current restraint pickup circuit 40 shown in FIG. 7 are functionally the equivalent of similiar circuit elements in the phase inrush current restraint pickup circuit shown in FIG. 6, the same circuit element designation used for the elements in FIG. 7 as for those in FIG. 6, except for the addition of a suffix letter "a". For example, the PNP transistor Q11a in FIG. 7 is identical in function to that of the PNP transistor Q11 in FIG. 6. The chief difference between the phase current restraint circuit 38 of FIG. 6 and the ground current restraint circuit 40 of FIG. 7 is the omission of the circuit elements equivalent to the resistors R31-R35 and the switches S7-S12 from the ground inrush current restraint circuit 40 of FIG. 7, with the emitters of the transistors Q12a and Q14a being connected through the diode D3a to the collector of the transistor Q1a, shown in the ground pickup circuit 12a of FIG. 3. In this way, the ground pickup circuit 12a is disenabled for the preselected time it takes for the timing capacitor C3a to charge to the voltage of the zener diode Z2, since the base current of the transistor Q2a is diverted to the B− power supply line through the diode D3a and the transistor Q14a. When the timing capacitor C3a has been charged to the value of the zener diode Z2, in a predetermined period of time determined by the setting of the switches S1a-S6a, the transistors Q12a, Q13a, Q14a are turned off and the minimum ground pickup current returns to its normal value.

The selected times for charging the ground timing capacitor C3a need not be the same as the selected times for charging the phase timing capacitor C3. For example, the resistors R24a-R30a can be selected so that opening only the lowest time switch S1a produces a disenabling time of 0.5 seconds for the ground minimum trip pickup circuit. The resistors R25a-R29a can be selected to produce respective pickup circuit disenabling times of 1, 2, 4, 8, and 16 seconds, so that this disenabling time can be selected to be any value in half second intervals, up to 31.5 seconds.

The inrush current restraint circuits described herein can be used with current sensing resistors, such as R1, whose voltage output is not only used to actuate the pickup circuit 12, but also as the input signal for the timing circuit 14, rather than with a current sensing resistor such as R5, whose voltage output is used solely to actuate the pickup circuit 12. However, if one of these restraint circuits were used to divert a portion of the current which would otherwise flow through the current sensing resistor R1, not only would the minimum pickup current be raised, but also the time-current tripping characteristics of the circuit interrupter would be increased during the selected time-to-normal period, which would increase the possibility of false or unnecessary operations of other overcurrent protective devices upline from the circuit interrupter.

Figure 8:
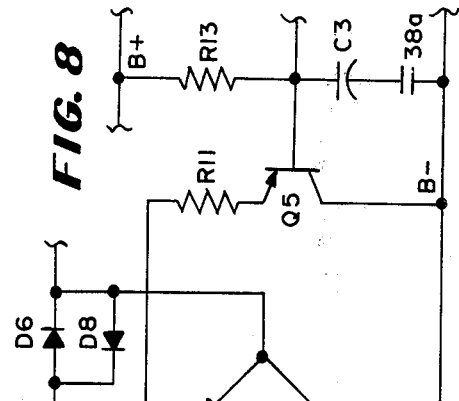
FIG. 8 is a schematic diagram of another embodiment of the invention.

Also, the restraint circuits described herein can be modified for use with a current sensing resistor which senses an alternating current having a peak value each half cycle which is proportional to the peak value of an alternating current of the power system. In such a modification, the parallel current path of the restraint circuit is coupled across the current sensing resistor R5 and any voltage compensating diodes connected in series with the resistor R5 through a single phase, full wave rectifier bridge circuit, which replaces the reverse blocking diode D3 and performs the same function of preventing the timing capacitor C3 from discharging through the current sensing resistor R5 each cycle when the voltage across the capacitor C3 exceeds that of the resistor R5. This is illustrated in FIG. 8, which shows the restraint circuit of FIG. 5 connected across the DC output of a single phase, full wave rectifier bridge 42, with the DC inputs of the rectifier bridge 42 being connected across the current sensing resistor R5. Four voltage compensating diodes, D5–D8, each connected in series with the resistor R5 so that one polarity of the alternating current flows through the diodes D5, D6 and the resistor R5 in series, and the opposite polarity of the alternating current flows through the diodes D7, D8 and the resistor R5 in series, are required to compensate for the voltage drop through the rectifier bridge 42, so that the initial minimum pickup current, relative to the normal minimum pickup current, is determined solely by the relative values of the resistors R5, and R11.

Since various modifications, adaptations, and variations of the foregoing specific disclosure can be made without departing from the teachings of the present invention, it is intended that the spirit and scope of this invention be limited only by the terms of the appended claims.

What is claimed is:

1. In an overcurrent protective device coupled to an electrical system, and including
   a main switch,
   switch opening means,
   current signal generating means, coupled to said system, for producing an input current signal proportional to a current of said system,
   a current sensing means, connected to receive said input current signal, for producing a first voltage signal proportional to said input current signal,
   overcurrent detection means, connected across said current sensing means to receive said first voltage signal, for producing an overcurrent pickup signal whenever said first voltage signal exceeds a predetermined minimum pickup value, and
   actuating means, connected to receive said overcurrent pickup signal, for actuating said switch opening means upon receipt of said overcurrent pickup signal, the combination which comprises:
   a voltage signal generating means for producing a second voltage signal having an initial predetermined rising voltage-time characteristic from the time said voltage signal generating means is actuated until said second voltage signal rises to a value at least as high as said pickup value of said first voltage signal;
   energization sensing means, coupled to said system, for actuating said voltage signal generating means when said system is energized; and
   a current path connected in parallel with said current sensing means, for diverting at least a portion of said input current signal from said current sensing means, which includes
      a voltage follower amplifier means having an input connected to receive said second voltage signal and an output connected in said parallel current path, for coupling said voltage signal generating means to said parallel current paths so that the voltage of said amplifier output, which follows and is approximately equal to said second voltage signal, opposes said first voltage signal, and
      rectifier means for preventing reverse breakdown of said voltage follower amplifier and subsequent reverse current flow in said parallel current path when said second voltage signal exceeds said first voltage signal;
   whereby, when said system is energized following a period of de-energization, said overcurrent detection means is inactivated for a time interval determined by said second voltage signal.

2. The combination described in claim 1, wherein said system is a three phase alternating power system and said current of said system is the ground or neutral current of said system.

3. The combination described in claim 1, in which said system is a three phase alternating electric power system, said main switch is a three phase interrupter, said respective current of said system is the ground, or neutral current of said system, wherein said actuating means include:
   ground timing current generating means, coupled to said system, for producing a direct current ground timing signal which is proportional to the ground current of said system; and
   ground timing means, coupled to receive said ground timing current signal and said overcurrent pickup signal for actuating said switch opening means after a period of time which is inversely proportional to said ground timing current signal, following the receipt of said overcurrent pickup signal.

4. In an overcurrent protective device coupled to an electrical system, and including
   a main switch,
   switch opening means
   current signal generating means, coupled to said system, for producing an input current signal proportional to a current of said system,
   a current sensing means, connected to receive said input current signal, for producing a first voltage signal proportional to said input current signal, overcurrent detection means, connected across said current sensing means to receive said first voltage signal, for producing an overcurrent pickup signal whenever said first voltage signal exceeds a predetermined minimum pickup value, and actuating means, connected to receive an overcurrent pickup signal, for actuating said switch opening means upon receipt of said overcurrent pickup signal, an inrush current restraint circuit, which comprises:

a voltage signal generating means for producing a second voltage signal having an initial predetermined rising voltage-time characteristic from the time said voltage signal generating means is actuated until said second voltage signal rises to a value at least as high as said pickup value of said first voltage signal;

energization sensing means, coupled to said system, for actuating said voltage signal generating means when said system is energized; and a current path connected in parallel with said current sensing means, for diverting at least a portion of said input current signal from said current sensing means, which includes a voltage follower amplifier means having an input connected to receive said second voltage signal and an output connected in said parallel current path, for coupling said voltage signal generating means to said parallel current path so that the voltage of said amplifier output, which follows and is approximately equal to said second voltage signal, opposes said first voltage signal, current limiting resistive means connected in series with said amplifier output, for limiting the portion of said input current signal which is diverted from said current sensing means, and rectifier means for preventing reverse breakdown of said voltage follower amplifier and subsequent reverse current flow in said parallel current path when said second voltage signal exceeds said first voltage signal;

whereby when said system is energized following a period of de-energization, the minimum pickup current is raised to a maximum initial value determined by said current limiting resistive means, then returned to its normal value in a time interval determined by said second voltage signal.

5. The combination described in claim 4, wherein:
said input current-signal is a direct current signal;
said rectifier means comprises a reverse blocking diode disposed in said parallel current path in series with said current limiting resistive means;
said current sensing means comprises
a pickup current sensing resistor for producing said first voltage signal, and
a voltage compensating diode connected in series with said pickup current sensing resistor to receive said input current signal; and
said parallel current path is connected across the series combination of said pickup current sensing resistor and said voltage compensating diode;
whereby the forward voltage drop across said compensating diode approximates the forward voltage drop across said reverse blocking diode, so that the initial pickup current following re-energization of the power system, relative to the normal pickup current, is determined solely by the relative values of said current limiting resistive means and said pickup current sensing resistor.

6. The combination described in claim 5, wherein said current limiting resistive means comprises;
a plurality of individually connectable parallel resistive paths, each resistive path including a current limiting resistor and a current limiting resistor switch connected in series with said current limiting resistor.

7. The combination described in claim 6, wherein:
a first one of said current limiting resistors has a value of resistance equal to a multiple of said pickup current sensing resistor, and each successive current limiting resistor has a value of resistance equal to half that of the preceeding current limiting resistor;
whereby, by closing the proper combination of said current limiting resistor switches, the initial minimum pickup current can be programed in even increments above the normal pickup current, each increment being equal to the increase in the initial minimum pickup current occuring when only said first current limiting resistor is connected by its respective switch into said parallel current path, the number of said programmable initial pickup currents being equal to an exponential power of 2, said exponent being the number of said current limiting resistors.

8. The combination described in claim 7, wherein each current limiting resistor switch is associated with a respective numerical marking indicative of the increase in the minimum pickup current which occurs when said current limiting resistor switch is closed, and which further comprises:
an inoperative, unconnected switch, similar in appearance to said current limiting resistor switches, which is permanently disposed in its closed position and associated with a respective numerical marking indicative of the value of the minimum pickup current when none of said current limiting resistors are connected into said parallel current path; and
a plurality of said numerical markings, each associated with a respective one of said current limiting resistors switches and said permanently closed unconnected switch;
whereby for any combination of open or closed current limiting resistor switches, the sum of the numerical markings associated with the closed current limiting resistor switches and the unconnected closed switch will be directly proportional to the minimum pickup current.

9. The combination described in claim 4, in which said voltage signal generating means include:
a direct voltage source;
a passive R-C timing circuit, having an input connected to said direct voltage source and an output connected to said voltage follower amplifier input, which comprises at least one capacitor and a capacitor charging resistive means, coupled in series with said at least one capacitor, for limiting the charging rate thereof; and
capacitor discharge switching means, connected across said timing circuit output and actuated by said energization sensing means, for discharging said at least one capacitor whenever said system is de-energized.

10. The combination described in claim 4, wherein said main switch is a sectionalizer switch and said actuating means includes:

arming signal generation means, coupled to receive said energization signal and said overcurrent pickup signal, for producing an arming signal which is initiated upon receipt of said overcurrent pickup signal and is terminated upon the cessation of said energization signal; and counting means, coupled to receive said arming signals, for actuating said switch opening means while said system is de-energized after receipt of a predetermined number of said arming signals.

11. The combination described in claim 4 in which said system is a three phase alternating electric power system, said main switch is a three phase interrupter, said respective current of said system is the highest magnitude phase current of said system, and said input current signal is a direct current signal having a peak value every half cycle which is proportional to the peak value of the largest magnitude phase current, wherein said actuating means include:

phase timing current generating means, coupled to said system, for producing a direct current phase timing signal having a peak value each half cycle which is proportional to the peak value of the highest magnitude phase current of said system; and phase timing means, coupled to receive said phase timing current signal and said overcurrent pickup signal for actuating said switch opening means after a period of time which is inversely proportional to said phase timing current signal, following the receipt of said overcurrent pickup signal.

12. In an overcurrent protective device coupled to an electrical system, and including a main switch, switch opening means current signal generating means, coupled to said system, for producing an input current signal proportional to a current of said system, a current sensing means, connected to receive said input current signal, for producing a first voltage signal proportional to said input current signal, overcurrent detection means, connected across said current sensing means to receive said first voltage signal, for producing an overcurrent pickup signal whenever said first voltage signal exceeds a predetermined minimum pickup value, and actuating means, connected to receive an overcurrent pickup signal, for actuating said switch opening means upon receipt of said overcurrent pickup signal, an inrush current restraint circuit, which comprises:

a voltage signal generating means for producing a second voltage signal having a predetermined, linear, rising voltage-time characteristic from the time said voltage signal generating means is actuated until said second voltage signal rises to a value at least as high as said first pickup value of said first voltage signal, wherein said voltage signal generating means includes a capacitor means for producing said second voltage signal, a constant current DC power supply means, coupled to said capacitor means, for linearly charging said capacitor means with respect to time to at least the minimum pickup value of said first voltage signal, and capacitor discharge switching means, connected across said capacitor means, for discharging said capacitor means whenever said system is de-energized;

energization sensing means, coupled to said system, for actuating said capacitor discharge switching means of said voltage signal generating means; and a current path connected in parallel with said current sensing means, for diverting at least a portion of said input current signal from said current sensing means, which includes a voltage follower amplifier means having an input connected to receive said second voltage signal and an output connected in said parallel current path, for coupling said voltage signal generating means to said parallel current path so that the voltage of said amplifier output, which follows and is approximately equal to said second voltage signal, opposes said first voltage signal, current limiting resistive means connected in series with said amplifier output, for limiting the portion of said input current signal which is diverted from said current sensing means, and rectifier means for preventing reverse breakdown of said voltage follower amplifier and subsequent reverse current flow in said parallel current path when said second voltage signal exceeds said first voltage signal;

whereby when said system is energized following a period of de-energization, the minimum pickup current is raised to a maximum initial value determined by said current limiting resistive means, then linearly returned with respect to time, to its normal value in a time interval determined by said second voltage signal.

13. The combination described in claim 12 wherein said constant current DC power supply means includes:

a direct voltage source;

a capacitor charging resistive means for determining the charging current supplied to said capacitor; and a transistor connected in common base configuration, having its collector coupled to one polarity of said direct voltage source through said capacitor means, its emitter coupled to an opposite polarity of said direct voltage source through said capacitor charging resistive means, and its base connected to said opposite polarity of said direct voltage source to charge said capacitor means to at least the minimum pickup value of said second voltage signal, at a constant charging current determined by said capacitor charging resistive means.

14. The combination described in claim 13, wherein said capacitor charging resistive means comprises:

a plurality of capacitor charging resistors connected in series, each charging resistor having a respective bypass switch connected across it for inserting or bypassing said charging resistor.

15. The combination described in claim 14 wherein the resistance of a first one of said capacitor charging resistors is selected to charge said capacitor to the minimum pickup value of said output voltage signal in a selected period of time after re-energization of said power system, and the resistance of each successive capacitor charging resistor is selected to be approximately double that of the preceeding capacitor charging resistor:

whereby, by opening the proper combination of said bypass switches, the time for the initial miminum pickup current to return to its normal pickup value can be programed in equal time intervals, each equal to said selected period of time, the number of said selectable time intervals being equal to one less than an exponential power of 2, where said exponent is the number of said bypass switches.

16. The combination described in claim 15, wherein:
said input currrent signal is a direct current signal;
said rectifier means comprises a reverse blocking diode disposed in said parallel current path in series with said current limiting resistive means;
said current sensing means comprises
 a pickup current sensing resistor for producing said first voltage signal, and
 a voltage compensating diode connected in series with said pickup current sensing resistor to receive said input current signal;
said parallel current path is connected across the series combination of said pickup current sensing resistor and said voltage compensating diode; and
said current limiting resistor means comprises a plurality of individually connectable parallel resistive paths, each resistive path including a current limiting resistor and a respective current limiting resistor switch connected in series with said current limiting resistor, a first one of said current limiting resistors having a value of resistance equal to a multiple of the resistance value of said pickup current sensing resistor, and each successive current limiting resistor having a value of resistance equal to half that of the preceeding current limiting resistor;
whereby by closing the proper combination of said current limiting resistor switches, the initial minimum pickup current can be programmed in even increments above the normal pickup current, each increment being equal to the increase in the initial minimum pickup current occurring when only said first current-limiting resistor is connected by its respective switch into said parallel current path, the number of said programmable initial pickup currents being equal to an exponential power of 2, said exponent being the number of said current limiting resistors.

17. The combination described in claim 14, wherein:
said capacitor charging resistive means further comprises a limiting resistor connected in series with said plurality of capacitor charging resistors;
a first one of said capacitor charging resistors has an actual resistance greater than the resistance of said limiting resistor and equal to a first calculated value of resistance for charging said capacitor to the minimum pickup value of said output voltage signal in a selected period of time after re-energization of said power system, less five-sixths of the resistive value of said limiting resistor;
a second one of said capacitor charging resistors has an actual resistance equal to twice said first calculated value of resistance less two-thirds of resistance of said limiting resistor;
a third one of said capacitor charging resistors has an actual resistance which is not less than four times said first calculated value of resistance less two-thirds of the resistance value of said limiting resistor, and not more than four times said first calculated value of resistance less one-third of the resistance value of said limiting resistor;
a fourth one of said capacitor charging resistors has an actual resistance value equal to eight times said first calculated value of resistance; and
the resistance of each successive capacitor charging resistor, starting with a fifth one of said capacitor charging resistors, is double the resistance of the preceeding capacitor charging resistor;
whereby by opening the proper combination of said bypass switches, the time for the initial minimum pickup current to return to its normal pickup value can be programmed in approximately equal time intervals, each approximately eaual to said selected period of time, the number of said selectable time intervals being equal to one less than an exponential power of two, where said exponent is the number of said bypass switches, the maximum deviation of any selectable time intervals from a respective multiple of said selected time being no more than one-sixth the percent deviation from said selected period of time which would occur when only said first capacitor charging resistor is inserted in series with said limiting resistor and said first charging resistor has an actual resistance equal to said first calculated value of resistance.

18. In an overcurrent protective device coupled to an electrical system, and including
a main switch,
switch opening means,
signal generating means, coupled to said system, for producing an input current signal proportional to a current of said system,
current sensing means, connected to receive said input current signal, for producing an output voltage signal thereacross proportional to said input current signal,
overcurrent detection means, connected across said current sensing means to receive said output voltage signal, for producing an overcurrent pickup signal whenever said output voltage signal exceeds a predetermined minimum pickup value, and
actuating means connected to receive said overcurrent pickup signal, for actuating said switch opening means upon recept of said overcurrent pickup signal, the combination which comprises:
energization sensing means, coupled to said system, for producing an energization signal whenever said system is energized;
a current path, connected in parallel with said current sensing means, for diverting a portion of said input current signal from said current sensing means, which includes
 a passive R-C timing circuit, which comprises at least one capacitor and a resistive means, coupled in series with said at least one capacitor, for limiting the charging rate thereof, and
 rectifier means for preventing the discharge of said at least one capacitor across said current sensing means, and
capacitor discharge switching means, connected across said at least one capacitor and activted by said energization sensing means, for discharging said at least one capacitor whenever said energization signal ceases;
whereby when said system is energized after a period of de-energization, the minimum pickup current is raised to a maximum initial value determined by said resistive means, then returned to its normal value during the time required for said at least one capacitor to be charged to said predetermined minimum pickup value of said output voltage signal.

* * * * *